Patented Dec. 19, 1933

1,939,993

UNITED STATES PATENT OFFICE 1,939,993

LUBRICATING OIL

Bert H. Lincoln and Alfred Henriksen, Ponca City, Okla., assignors to Continental Oil Company, Ponca City, Okla., a corporation of Delaware No Drawing. Application July 14, 1932
Serial No. 622,463

2 Claims. (Cl. 87—9)

Our invention relates to lubricating oils and specifically comprises such products as new composition of matter.

It is well known that mineral lubricating oils are deficient in oiliness characteristics, which is the most important character of the lubricant when used under conditions of boundary lubrication, where the viscosity of the lubricant plays little or no part in lubrication. Boundary lubrication conditions are obtained when engines are operating at heavy loads, low speeds, or, if for any reason, the supply of lubricant is cut off or not sufficient. This last condition may exist when for mechanical reasons the lubricant pump is not functioning properly or when the lubricant feed line is clogged with some foreign material. Therefore, the importance of this invention will be readily appreciated by those skilled in the art of lubrication, since this invention provides a lubricant of high oiliness character, low coefficient of friction, and acts as a safety factor in lubrication when abnormal conditions exist for one reason or another.

This invention also provides a lubricant which maintains a very low coefficient of friction when diluted with light hydrocarbons such as are obtained in an automobile crankcase by incomplete combustion of the fuel. The lubricant prepared by this process has penetrative lubricity characteristics and it has been found that the lubricant does not drain off the rubbing surfaces when idle, thereby providing a lubricating film on the rubbing surfaces at all times, which is of great value to the life of the machine in starting and stopping the machine particularly during cold weather.

It has been demonstrated a number of times that hydrocarbon lubricants of the very best quality are not constant in coefficient of friction with all operating conditions, etc. constant. The coefficient of friction pointer or indicator will not come to rest but fluctuates over a rather wide range. This fluctuation in friction is at a minimum with a castor oil lubricant, which is one reason that castor oil is used as a lubricant by the experienced race track driver. The lubricant of this invention gives a fairly constant friction reading and much better than the very high quality straight hydrocarbon lubricant.

The lubricant of this invention has a very much higher film strength than high quality straight hydrocarbon lubricants. This is a very important characteristic in a lubricant because the designers of machines are greatly increasing the operation pressures at various frictional points. Straight hydrocarbon lubricants have been found unsatisfactory, since, when spread in very thin films due to high pressure, they have a tendency to break down and allow seizure of the rubbing surfaces.

The method we have discovered for accomplishing the above desirable results comprises broadly of adding the condensation product of halogenated fats, esters, glycerides, etc. with aromatic hydrocarbons, to a hydrocarbon lubricant.

An example will serve to demonstrate the method of practicing our invention, but is not to act as a limitation thereto. Example: Commercial lard oil was chlorinated for a period slightly in excess of 12 hours. 100 grams of the thus chlorinated lard oil were blended with 10 grams of naphthalene; and after thorough mixing and/or dissolving the mixture was treated with 10 grams of anhydrous aluminum chloride. Upon completion of the reaction the product was heated to a temperature above its reacting temperature to drive off excess chlorine and/or hydrogen chloride. The product may or may not be blended with a solvent, such as gasoline, naphtha or kerosene, to facilitate settling of the aluminous sludge. In this particular example the product was blended with a light naphtha. After settling of sludge the product is first given a weak hydrochloric acid wash so as to remove any aluminum and to prevent it from combining with the fat. The product is then washed until free of traces of acid; then the solvent is distilled off.

To prove the increased oiliness value of the above product it was added in small amounts to a high quality hydrocarbon lubricant and tested on the Herschel friction testing machine (developed by Dr. W. H. Herschel of the United States Bureau of Standards). To demonstrate higher film strength another blended sample was tested on the Timken testing machine (developed by the Timken Roller Bearing Company).

The 350 straight pale oil used for the oiliness test had an original coefficient of friction of 0.140 by the Herschel test. ½ of 1% of the product of the above condensation in this oil gave a reading of only 0.073 or practically half of the friction of the original high quality lubricant.

On the Timken machine the original lubricant broke down and allowed seizure when 18.2 pound weights had been added, which corresponds to an operating pressure of 10,500 pounds per square inch. To another sample of the same oil, 1% of the product of the above condensation was added and then the Timken test repeated. The blended sample did not break down and allow seizure until 43 pound weights had been added, which is equivalent to approximately 24,500 pounds per square inch operating pressure. With 1% of the condensation product the film strength was more than doubled.

As stated above any of the animal or vegetable fatty oils or glycerides may be used in making the condensation product. The various natural occurring and synthetic esters of fatty acids and mono, di and tri hydric alcohols. The products may be halogenated by any of the known methods. The degree of halogenation may be varied over very wide limits, depending upon the particular substances under treatment and the characteristics desired in the finished product. The substances may be halogenated with a mixture of two or more halogens.

The reaction involved in the condensation is commonly referred to as the Friedel-Crafts reaction, of which there are a number of modifications. This invention contemplates the use of the product of the various modified reactions. The reaction may be conducted in a solvent; iron chloride and zinc chloride may be used to give a similar product; but aluminum chloride is preferred.

Any of the aromatic hydrocarbons may be used. The natural occurring aromatic hydrocarbons or substances rich in such are entirely satisfactory. A partially halogenated aromatic compound may be used.

The amounts of each reacting agent may be varied with respect to the other over wide limits, depending upon a number of factors—degree of halogenation, type of aromatic compound, condensing agent, character desired in the finished product, etc. Reacting quantities are calculated to leave more or less halogen in the finished product. The halogen as part of the organic molecule is beneficial in the finished lubricant.

The final product of condensation which is to be added to the hydrocarbon lubricant is not a pure chemical compound, but a mixture of compounds. The mixture includes unchanged halogenated fatty oil, unchanged aromatic molecules, molecules made by the condensation of halogenated fatty oil and/or acid on the aromatic molecule and other compounds.

Our invention contemplates adding from 0.1% to 5% or more of the product of the above condensation to any type of hydrocarbon lubricant.

We do not limit our invention to any particular theory but we believe the strongly polar molecules act to accomplish the actual result demonstrated in the above example.

Having thus described our invention, what we claim is:

1. A lubricating oil comprising in combination a hydrocarbon oil and a small quantity of a halogeniferous condensation product selected from the following group: halogenated aromatic hydrocarbon – ester condensation product, aromatic hydrocarbon – halogenated ester condensation product, chlorinated aromatic hydrocarbon – glyceride condensation product, aromatic hydrocarbon – chlorinated glyceride condensation product, fatty oil – chlorinated aromatic hydrocarbon condensation product, chlorinated fatty oil – aromatic hydrocarbon condensation product, a halogenated ester – aromatic hydrocarbon condensation product, a halogenated ester – halogenated aromatic hydrocarbon condensation product.

2. A lubricating oil comprising in combination a hydrocarbon oil and a small percentage of the halogenated condensation product obtained by condensing a fatty oil with an aromatic hydrocarbon.

BERT H. LINCOLN.
ALFRED HENRIKSEN.